Feb. 13, 1934.  W. GEYGER  1,947,411
ELECTRICAL INTEGRATING DEVICE
Filed May 27, 1932
Fig. 1
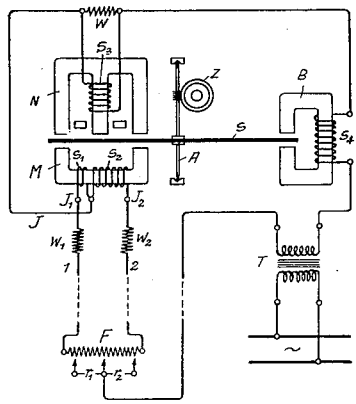
Fig. 2
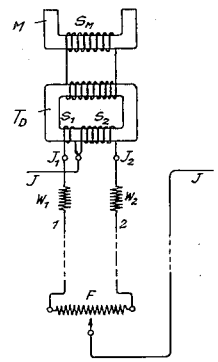
Fig. 3
Fig. 4
Inventor:
Wilhelm Geyger Patented Feb. 13, 1934

1,947,411

UNITED STATES PATENT OFFICE 1,947,411

ELECTRICAL INTEGRATING DEVICE

Wilhelm Geyger, Dusseldorf, Germany

Application May 27, 1932, Serial No. 613,933, and in Germany May 25, 1931

9 Claims. (Cl. 171—264)

This invention relates to a method and device for the electrical integration of measured values.

In numerous technical devices, particularly control plants for increasing the heating efficiency from an economical point of view, the measured quantities found by means of mechanical measuring instruments, such as steam and water meters, have to be integrated electrically. For this purpose devices are adapted in which, at the point of measurement, one or several resistances are altered by the mechanical transmitting device according to the measured value to be integrated and in which these resistances or their relation are recorded by a motor meter acting as receiving device in such a way that the number of revolutions of the meter is always proportional to the value of the measured quantity. If a motor meter which is independent of the voltage is employed for recording the resistance values or coefficients corresponding to the instantaneous values of the measured quantity instead of an ordinary meter of the kind found in average arrangements the fundamental advantage will be gained that the metering is independent of voltage variations of the source of the measuring current. In order to directly connect the measuring plant to the alternating current network, which is generally aimed at nowadays, an alternating current meter is preferably used or it would be necessary to provide rectifiers which, however, always render a plant more complicated and produce numerous drawbacks.

The resistance distance transmitter, usually referred to as distance transmitter, which is generally employed for such measurements comprises a distance transmitter resistance drum and a brush and is mechanically coupled with the pointer axis of the transmitting device, such as a water meter, so that each position of the pointer of the transmitting device is represented by a certain position of the brush and thus by a certain ratio of resistance. By uniformly winding the resistance drum it can be readily attained that similar angles correspond to similar resistance coefficients (linear characteristic of the distance transmitter). The brush controlled by the transmitting device covers on the distance transmitter resistance a certain range whose limits represent the initial and end positions of the pointer of the transmitting device, such as, for example, 0 and 100% of the quantity of water. Therefore, if the pointer of the transmitting device and the contact brush are deflected from their joint initial position (0%) proportionally to the instantaneous value of the measured quantity, the brush will cover a certain amount of resistance proportional to the instantaneous value of the measured quantity. It is now of importance to include both the distance transmitter and the meter in measuring connections of a kind which insure that the number of revolutions of the meter is accurately proportional to this amount of resistance.

The measuring connections chosen must further permit to arrange for the initial position of the brush corresponding to the zero value of the measured quantity (zero position of the pointer of the transmitting device) at any point of winding of the distance transmitter, which is necessary for the reason that in practical operation it is possible only in rare instances to make the initial position of the brush coincide with the beginning of the winding of the distance transmitter. Furthermore, these measuring connections must be such as to insure simple and exact integration of the sum of several measured quantities in an easy manner. Finally, these connections must permit the employment of an induction meter independent of the voltage in order to allow direct working with alternating current.

It is the aim of the invention to provide a suitable method of electrical integration which fulfils all these conditions and, further, to provide devices for carrying out the method, which are characterized by great simplicity, accuracy and safety in operation. The systematic development of these measuring arrangements representing the object of the invention proceeded from the desire to employ the usual normal alternating current connections as used in carrying out distance metering independent of the voltage by means of resistance distance transmitters and ring iron quotient meters, in which three lines lead to each transmitter, also in connection with induction meters which are independent of the voltage, too. This results in a uniform and clear arrangement of the total connections, which represents quite an advantage that is of special importance, for instance, in large heat controlling plants.

In all the connections described below an alternating current motor meter is employed in a manner known per se in connection with a resistance distance transmitter whose sliding contact slides on a resistance and distributes current over two parallel branches the sum of whose resistances is invariable. The characteristic feature of the invention is that a coil is provided for each of the two parallel branches and that these two coils are used for producing one of the actuating fluxes, e. g. the actuating flux of current, that are effective in the motor meter, the coils being connected in such a way that this actuating flux is proportional to the difference in the ampere-turns of the two coils. According to the invention, the number of turns of the two coils and the two branch currents flowing at a time in the two parallel branches are dimensioned so that the actuating flux will be equal to zero when the sliding contact is at that point of the distance transmitter resistance which corresponds to the zero value of the measured quantity to be integrated.

If the sum of several measured quantities is to be electrically integrated by means of an alternating current motor meter and several resistance distance transmitters provided for these quantities, the invention provides that in all distance transmitters a coil serving for producing an actuating flux is provided for each of the two parallel branches and that the measuring circuits corresponding to the various measured quantities and containing each a resistance distance transmitter and two coils are joined in series and connected to a common alternating current source.

The device for carrying out the method according to the invention, if a single measured quantity has to be integrated, is characterized by the fact that one of the actuating cores, such as the core for the current coil, of the motor meter is provided with two opposing coils which are inserted in the two parallel branches of the branching off of the current of the distance transmitter. However, the invention makes it possible also to provide one of the actuating cores of the motor meter, e. g. the core of the current coil, with a single coil connected to the secondary coil of a transformer with two primary coils which oppose each other and are inserted in the two parallel branches of the distance transmitter circuit.

If the sum of several measured quantities is to be electrically integrated, the device for carrying out the method according to the invention is characterized by the feature that one of the actuating cores, e. g. the core of the current coil, of the motor meter possesses as many pairs of opposing coils as there are measured quantities or the actuating core may possess only one coil which is connected to the secondary coil of a transformer possessing as many pairs of opposing primary coils as there are measured quantities. Concerning the alternating current meter employed in connection with the invention it may be stated that an induction meter not independent of the voltage of known type may be used in connection with a known device, such as an iron filament lamp, which will keep the total current flowing in the branching or branchings off of the distance transmitters constant. It is, however, a better way to employ as motor meter a known type of induction meter working independently of the voltage and in such connections that metering is independent of the fluctuations of the total current flowing in the branching or branchings off of the distance transmitter and therefore also of the voltage variations of the network. The invention provides a particularly simple and advantageous special connection according to which an induction meter of known type and independent of the voltage is provided with brake magnets supplied with alternating current under such conditions that both the current flowing through the voltage coil of the meter and that flowing through the coil of the brake magnet are proportional to the total current in the branching or branchings off of the distance transmitter.

The nature and functioning of the object of the invention will be treated now below on an exactly theoretical basis by means of a few examples.

Fig. 1 shows a diagram of connections of the entire plant adapted for integrating a measured value; Fig. 2 shows a part of Fig. 1 with a different connection; and Figs. 3 and 4 show connecting possibilities of a part of the device according to Fig. 1 for integrating several measured quantities.

If only one measured quantity is to be integrated, the connection shown in Figure 1 may be employed which constitutes the fundamental arrangement for the differential connections treated below.

The aluminum disc S secured to the shaft A and coupled with the counter Z, which forms part of a single phase induction meter, is driven by the two electromagnets M and N and braked by the electromagnet B. The iron core of M (core of the current coil) carries the two coils S1 and S2 which are inserted in the normal branching off of the current of the distance transmitter indicated in Fig. 1 and which are connected as differential coils, so that the currents flowing in them magnetize the core of the current coil in the opposite sense. The coil S3 on the iron core of N (voltage core) is disposed parallel to the non-inductive and non-capacitive resistance W which is connected in series with the branching off of the current of the distance transmitter and with the coil S4 arranged on the iron core of B (braking core) and connected to the alternating current network by the interposition of the protective transformer T.

The two ends of the distance transmitter winding F and the contact brush sliding on this winding and controlled by the transmitting device, e. g. a water meter, are connected with the other parts of the measuring connection by means of three distance lines and the two balancing resistances W1 and W2. The brush divides the range of the distance transmitter resistance covered by it, according to Fig. 1, into two partial resistances $r_1$ and $r_2$ whose variable relation is taken up by the coils S1 and S2, the variation of $r_1$ and $r_2$ taking place in such a way that the ohmic resistance of one branch of the branching off of the distance transmitter current increases to the same extent as that of the other decreases. In this branching off of the current the branches are magnetically coupled. If $R_1$ and $R_2$ represent the total ohmic resistances of the branches 1 and 2, $L_1$ and $L_2$ represent the inductances of the coils S1 and S2, M the mutual inductance of these coils, $\omega$ the angular velocity, $e$ the voltage (instantaneous value) between the branching points, $i_1$ and $i_2$ the two branch currents (instantaneous values), the following voltage equations will result, since the two branches have an inducing effect upon each other in opposite senses, viz.

$$e = R_1 i_1 + L_1 \frac{di_1}{dt} - M \frac{di_2}{dt}, \qquad (1a)$$

$$e = R_2 i_2 + L_2 \frac{di_2}{dt} - M \frac{di_1}{dt}. \qquad (1b)$$

from which follows the equation of condition for the branching off of the current at each instance:

$$R_1 i_1 + (L_1 + M) \frac{di_1}{dt} = R_2 i_2 + (L_2 + M) \frac{di_2}{dt} \qquad (1c)$$

When employing the symbolic method and J1 and J2 represent the currents flowing in the branches 1 and 2 and $$j = \sqrt{-1}$$

the imaginary unit, one may write:
$$J_1[R_1+j\omega(L_1+M)] = J_2[R_2+j\omega(L_2+M)], \quad (1d)$$
wherein
$$a_1 = R_1 + j\omega(L_1+M)$$
and
$$a_2 = R_2 + j\omega(L_2+M)$$
represent the resistance potential differences of the branches 1 and 2, If in symbolic writing $J = J_1 + J_2$ designates the total current flowing in the banching off of the distance transmitter current, the following formulæ apply:
$$J_1 = J\frac{a_1 a_2}{a_1+a_2}\frac{1}{a_1} = J\frac{a_2}{a_1+a_2}, \quad (2a)$$
$$J_2 = J\frac{a_1 a_2}{a_1+a_2}\frac{1}{a_2} = J\frac{a_1}{a_1+a_2}, \quad (3a)$$
and, if the corresponding values as stated above are taken for $a1$ and $a2$,
$$J_1 = J\frac{R_2+j\omega(L_2+M)}{R_1+R_2+j\omega(L_1+L_2+2M)}, \quad (2b)$$
$$J_2 = J\frac{R_1+j\omega(L_1+M)}{R_1+R_2+j\omega(L_1+L_2+2M)}. \quad (3b)$$

The magnetic field $\Phi M$ of M (field of current) is proportional to the difference of the ampere-turns of S1 and S2 effective at a given time. If $z1$ and $z2$ indicate the number of turns of S1 and S2 and if $n = z2/z1$ represents the ratio of these numbers of turns,
$$\Phi M = \text{const}(J_2 z_2 - J_1 z_1) = \text{const } z_1(J_2 n - J_1) \quad (4a)$$
or
$$\Phi M = \text{const } z_1 J \frac{R_1 n - R_2 + j\omega(L_1+M)n - j\omega(L_2+M)}{R_1+R_2+j\omega(L_1+L_2+2M)} \quad (4b)$$

As the coils S1 and S2 closely superposed on the core for the current coil or consisting of two simultaneously wound wires disclose a practical magnetic coupling without leakage, the following formulæ apply, viz.
$$L_2 = L_1 n^2 \quad (5)$$
and
$$M = \sqrt{L_1 L_2} = L_1 n. \quad (6)$$

If the values found in the Equations (5) and (6) for $L_2$ and $M$ are now inserted in the Equation (4b), it will be found that
$$(L_1+M)n - (L_2+M) = 0 \quad (7)$$
Then will be
$$\Phi M = \text{const } z_1 J \frac{R_1 n - R_2}{R_1+R_2+j\omega L_1(1+n)^2} \quad (8a)$$
or
$$\Phi M = \text{const } z_1 J \frac{R_1 n - R_2}{\sqrt{(R_1+R_2)^2 + \omega L_1^2(1+n)^{4'}}} \quad (8b)$$

If $\delta_1 = R1 - r1$ and $\delta_2 = R2 - r2$ indicate the parts of R1 and R2 not covered by the brush and if $r = r1+r2$ represents the constant resistance between the two limit positions of the brush, the following formula will apply:
$$\Phi M = \text{const } z_1 J \frac{n + r_1 n - - r + r_1}{\sqrt{(R_1+R_2)^2 + \omega L_1^2(1+n)^{4'}}} \quad (8c)$$

If the ohmic resistances of the current branches of the distance transmitter are chosen so that
$$\delta_1 n = \delta_2 + r \quad (9)$$

the following formula applies:
$$\Phi M = \text{const } z_1 J r_1 (1+n) \frac{1}{\sqrt{(R_1+R_2)^2 + \omega L_1^2(1+n)^{4'}}} = \text{const } J r_1 \quad (10a)$$
and
$$\not\!\!\prec(\Phi M, J) = \text{const.} \quad (10b)$$

The magnetic field of $\Phi N$ (voltage field) is proportional to the current $J$ flowing through the distance transmitter current branching;
$$\Phi N = \text{const } J, \quad \not\!\!\prec(\Phi N, J) = \text{const.} \quad (11)$$

Furthermore, the magnetic field $\Phi B$ of the braking core B (braking field) is proportional to this current $J$:
$$\Phi B = \text{const } J, \quad \not\!\!\prec(\Phi B, J) = \text{const.} \quad (12)$$

The torque produced by the two driving magnets M and N and the braking effect caused by the magnet B is expressed in the formula
$$\text{torque} = \text{const } \Phi M \cdot \Phi N = \text{const } J^2 r_1, \quad (13)$$
$$\text{braking effect} = \text{const } \Phi B^2 = \text{const } J^2. \quad (14)$$

This shows that the prevailing number of revolutions of the aluminum disc S coupled with the counter Z is strictly proportional to the resistance $r1$ and thus to the instantaneous value of the measured quantity. This number of revolutions is, however, practically independent of the fluctuations of the measuring current $J$ during operation, which are due to the variations of the combination resistance of the distance transmitter current branchings, which depend on the brush position, further, to variations in the contact resistance on the brush and, finally, to the voltage variations appearing during operation in the alternating current network. The number of revolutions is further practically independent of the variations in frequency of the network, since torque and braking effect increase or decrease approximately to the same extent during variations in frequency.

The equation (10a) indicates to what extent the total current $J$ flowing through the current branches of the distance transmitter is utilized for the production of the torque. The formula $z = z1 + z2$ designates the total number of turns of the coils S1 and S2 arranged on the core of the current coil while $AW_M$ designates the ampere-turns actually assisting in the production of the torque and influencing the core. Thus will be
$$z = z_1(1+n) \quad (15)$$
and, according to the Equations (4a) and (10a),
$$AW_M = zJ\frac{r_1}{\sqrt{(R_1+R_2)^2 + \omega^2 L_1^2(1+n)^{4'}}}. \quad (16a)$$
Since in view of the actual resistance conditions
$$\omega^2 L_1^2 (1+n)^4 = \omega^2 L_2^2 \left(\frac{1+n}{n}\right)^4 \quad (17)$$
may be neglected with respect to $(R1+R2)^2$, the following formula applies very approximately, viz.
$$AW_M = zJ\frac{r_1}{R_1+R_2} \quad (16b)$$

Actually, the following resistance coefficients will be approximately used:
$$\delta_1 = 40\Omega = \delta_2 = 70\Omega, \quad r = r_1+r_2 = 160\Omega.$$

If the brush is in end position ($r1=160\Omega$), i. e., if the measured quantity reaches its highest value, the following formula prevails, viz.

$$AW_M = zJ\frac{160}{270} = zJ.0,6.$$

so that 60% of the ampere-turns $zJ$ will be utilized for the production of the torque. The utilization of energy in the differential connection described is much more favorable than in the numerous known bridge or potential divider connections which work at a very low degree of efficiency if resistance conditions in the bridge or potentiometer are chosen so that the absolutely needed proportionality between the meter current and the measured quantity is insured to a practically sufficient degree. While bridge or potentiometer connections will permit only an approximation of a proportionality between the meter current and the measured quantity, the proportionality attained in the differential connections as well as in the connections to be described below is strictly founded theoretically for the entire measuring range.

If a single measured quantity is to be integrated, the differential connection shown in Fig. 2 may be applied also which differs from the connection shown in Fig. 1 merely insofar as the coil $S_M$ arranged on the core M of the induction meter and requiring here no tapping is connected by the interposition of the differential transformer $T_D$ with the distance transmitter current branchings, the two primary coils S1 and S2 of the transformer being inserted in the branches 1 and 2. What has been said with respect to the fundamental connections according to Fig. 1 applies here too.

When supervising the operation of heating equipment it is often necessary to electrically integrate the sum of several measured quantities, which are important for operation, and each of which can be registered only singly by direct measurement. By employing the measuring arrangements described in connection with several resistance distance transmitters for the various quantities forming the sum and the sum connections briefly described below such measurements can be carried out with great accuracy.

The sum connection shown in Fig. 3 is characterized by the fact that the two coils S1 and S2 provided on the cores M of the induction meter are subdivided into as many partial coils as there are quantities forming the sum, the various partial windings being spatially arranged so that they possess the same interlinked magnetic circuit as the core M. This can be readily attained by simultaneously winding side by side as many insulated wires as there are quantities forming the sum and by assigning the electrically and magnetically absolutely equal partial windings thus produced to the various quantities concerned. The partial windings, which correspond to one another, of the coils S1 and S2 form with a distance transmitter F each a current branch in the same manner as in the connection shown in Fig. 1. The branches thus formed are connected in series in the way indicated in Fig. 3 and included in the common measuring connection of the induction meter. The auxiliary resistances $W_H$ arranged in the various measuring circuits serve for taking into consideration the magnitude of the maximum values of the quantities forming the sum.

Fig. 4 illustrates another type of sum connection by means of an integrating transformer, in which the coil $S_M$ arranged on the core M of the induction meter is connected to the secondary coil of a special current transformer $T_E$ whose primary coils S1 and S2 have as many partial windings as there are quantities forming the sum. The corresponding partial coils of S1 and S2 form each a current branch together with a distance transmitter F. The various measuring circuits are connected in series, too, and included in the common measuring connection of the meter. The magnitude of the maximum values of the quantities is taken care of either by the auxiliary resistances $W_H$ or by suitably choosing the winding conditions of the integrating transformer, the ratio of the number of turns of the various pairs of primary coils being equal to the ratio of the maximum values of the quantities assigned to them.

The connections shown in Figs. 3 and 4 are based on the fact that the ampere-turns of the coils S1 and S2 acting on the core M correspond to the sums of the branch currents $J'1$ and $J''1$ or $J'2$ and $J''2$. The sums $J'1+J''1=J1$ and $J'2+J''2=J2$ are registered exactly by the combined partial windings of the coils of the core M (Fig. 3) or by the integrating transformer (Fig. 4).

Connections of this class afford the great advantage that the measuring accuracy of each unit quantity is the same by percentage, even if the values of measuring ranges differing totally in size have to be added. This is attained by taking care of the magnitude of the various quantities to be integrated not by a change in the drum resistances but by means of correspondingly dimensioned auxiliary resistances ($W_H$ in Figs. 3 and 4) or by correspondingly chosen winding conditions of the integrating transformer (Fig. 4). Therefore, the normal types of distance transmitters can be used without any changes.

It will be evident from what has been said above that the method according to the invention affords considerable advantages as compared with the known integrating methods operating with resistance distance transmitters and alternating current meters. Of special practical importance is the fact that the method according to the invention while making use of the normal distance transmitting connection with three lines makes it possible, without the least trouble, to arrange for the initial position of the brush corresponding to the zero value of the measured quantity (zero position of the pointer of the transmitting device) at any point of the winding of the distance transmitter. As stated before, this is necessary as it is possible only in rare instances to have the initial position of the brush coincide with the beginning of the winding of the distance transmitter. The advantageous features of the invention explained and theoretically developed above have been confirmed by extensive experiments.

I claim:—

1. A device for the electrical integration of measured quantities, comprising an alternating current meter fitted with driving and braking magnets, a resistance distance transmitter consisting of an electric resistance and a sliding contact moving thereon, two branch lines connected to said resistance and being invariable as to their total resistance, two coils positioned on one of the driving magnets of the alternating current meter for producing the actuating fluxes effective within said alternating current meter and assigned to each of said branch lines and connected so that said meter actuating flux is proportional to the difference in the ampere-turns of both coils.

2. A device for the electrical integration of measured quantities, comprising an alternating current meter fitted with driving and braking magnets, a resistance distance transmitter consisting of an electric resistance and a sliding contact moving thereon, two branch lines connected to said resistance and being invariable as to their total resistance, two coils positioned on one of the driving magnets of the alternating current meter for producing the actuating fluxes effective within said alternating current meter and assigned to each of said branch lines and connected so that said meter actuating flux is proportional to the difference in the ampere-turns of both coils, the number of turns of both coils and the currents flowing in the two branch lines being dimensioned so that the actuating flux is equal to zero when the sliding contact is at the point of the electric resistance of said distance transmitter corresponding to the zero value of the measured quantity to be integrated.

3. A device for the electrical integration of measured quantities, comprising an alternating current meter fitted with driving and braking magnets, a resistance distance transmitter consisting of an electric resistance and a sliding contact moving thereon, two branch lines connected to said resistance and being invariable as to their total resistance, a transformer having two opposing primary coils, said coils being inserted in said branch lines, a secondary winding and a coil on one of said driving magnets of said alternating current meter, said coil being connected to said secondary winding.

4. A device for the electrical integration of measured quantities, comprising an alternating current meter fitted with driving and braking magnets, a resistance distance transmitter consisting of an electric resistance and a sliding contact moving thereon, two branch lines connected to said resistance and being invariable as to their total resistance, two coils positioned on one of said driving magnets of the alternating current meter for producing the actuating fluxes effective within said alternating current meter and assigned to each of said branch lines and connected so that said meter actuating flux is proportional to the difference in the ampere-turns of both coils, said alternating current meter consisting of an induction meter dependent on the voltage and means for keeping constant the total current flowing in the branch lines.

5. A device for the electrical integration of measured quantities, comprising an alternating current meter fitted with driving and braking magnets, a resistance distance transmitter consisting of an electric resistance and a sliding contact moving thereon, two branch lines connected to said resistance and being invariable as to their total resistance, two coils positioned on one of the driving magnets of the alternating current meter for producing the actuating fluxes effective within said alternating current meter and assigned to each of said branch lines and connected so that said meter actuating flux is proportional to the difference in the ampere-turns of both coils, said alternating current meter consisting of an induction meter which is independent of the voltage and being connected so that the metering is unaffected by the variations of the total current flowing in the branches and thus independent also of fluctuations in the network.

6. A device for the electrical integration of measured quantities, comprising an alternating current meter fitted with driving and braking magnets, a resistance distance transmitter consisting of an electric resistance and a sliding contact moving thereon, two branch lines connected to said resistance and being invariable as to their total resistance, two coils positioned on one of the driving magnets of the alternating current meter for producing the actuating fluxes effective within said alternating current meter and assigned to each of said branch lines and connected so that said meter actuating flux is proportional to the difference in the ampere-turns of both coils, said alternating current meter consisting of an induction meter which is independent of the voltage and provided with brake magnets supplied with alternating current, said meter being connected so that the current flowing through the voltage coil of said induction meter and through the coil of the brake magnets is proportional to the total current flowing in the branches.

7. A device for the electrical integration of measured quantities, comprising an alternating current meter fitted with driving and brake magnets, a plurality of resistance distance transmitters consisting each of an electric resistance and a sliding contact moving thereon and being each assigned to one measured quantity only, a pair of branch lines for each resistance, a number of pairs of coils corresponding to the number of said resistances and disposed on one of said driving magnets of the alternating current meter and connected to the pairs of branch lines, and a common source of alternating current to which the measuring circuits formed of the resistance distance transmitters appurtenant to the measured quantities with their respective pairs of coils are connected.

8. A device for the electrical integration of measured quantities, comprising an alternating current meter fitted with driving and braking magnets, a plurality of resistance distance transmitters consisting each of an electric resistance and a sliding contact movable thereon and being each assigned to one measured quantity only, a pair of branch lines for each resistance, a number of pairs of coils corresponding to the number of said resistances and disposed on one of said driving magnets of the alternating current meter and connected to the pairs of branch lines, and a common source of alternating current to which the measuring circuits formed of the resistance distance transmitters appurtenant to the measured quantities with their respective pairs of coils are connected.

9. A device for the electrical integration of measured quantities, comprising, for the purpose of integrating the sum of several measured quantities, an alternating current meter fitted with driving and brake magnets, a plurality of resistance distance transmitters consisting each of an electric resistance and a sliding contact movable thereon and being each assigned to one measured quantity only, a pair of branch lines for each resistance, a transformer having a plurality of opposing pairs of primary coils corresponding to the number of resistance distance transmitters, a secondary coil and a coil on one of said driving magnets of the alternating current meter, said coil being connected to said secondary coil.

WILHELM GEYGER.